US006278691B1

(12) United States Patent
Ohyama et al.

(10) Patent No.: US 6,278,691 B1
(45) Date of Patent: Aug. 21, 2001

(54) COMMUNICATIONS SYSTEM

(75) Inventors: Satoshi Ohyama, Ashiya; Masaaki Higashida, Moriguchi; Yoshihiro Morioka, Kashiba, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/024,790

(22) Filed: Feb. 17, 1998

(30) Foreign Application Priority Data

Feb. 17, 1997 (JP) .................................................. 9-031610

(51) Int. Cl.$^7$ .................................................. H04L 12/54
(52) U.S. Cl. .................... 370/235; 370/428; 370/498; 348/14.11
(58) Field of Search ............................ 348/16, 17, 14.01; 370/259, 260, 263, 264, 265, 270, 230, 231, 232, 395, 465, 235, 412, 428, 429, 498; 368/14.11

(56) References Cited

U.S. PATENT DOCUMENTS

| 5,600,646 | * | 2/1997 | Polomski | ............................. | 370/263 |
| 5,844,600 | * | 12/1998 | Kerr | ....................................... | 348/17 |
| 6,011,590 | * | 1/2000 | Saukkonen | ........................... | 348/419 |

FOREIGN PATENT DOCUMENTS

| 0701371 | 3/1996 | (EP) . |
| 07170290 | 7/1995 | (JP) . |
| 07170291 | 7/1995 | (JP) . |
| 07170292 | 7/1995 | (JP) . |
| 07170502 | 7/1995 | (JP) . |
| 07170503 | 7/1995 | (JP) . |
| 07170504 | 7/1995 | (JP) . |
| 95/14337 | 5/1995 | (WO) . |

OTHER PUBLICATIONS

B.L. Tierney et al. "Performance Analysis in High–Speed Wide Area IP–over–ATM Networks: Top–to–Bottom End–to–End Monitoring", IEEE Network, May/Jun. 1996 pp. 26–39.

Akifumi Ide, et al., "' DVC'Standards for Consumer–Use Digital VCRs", *National Technical Report*, vol. 41, No. 2, Apr. 1995.

\* cited by examiner

*Primary Examiner*—Ricky Ngo
(74) *Attorney, Agent, or Firm*—Smith, Gambrell & Russell

(57) ABSTRACT

A communications system has a real time signal generating part for generating the real time signal of data rate R with one frame as one unit; a transmission part, having a transmission rate C (C>R), over which the real time signal is transmitted; and a real time signal outputting part for outputting the real time signal stored in a real time signal receive buffer part, wherein after storing the real time signal for a prescribed number, N, of frames in the real time signal receive buffer part, the real time signal outputting part is activated, thereby performing control so that all generated portions of the real time signal can be output at the receiving end without interruption.

6 Claims, 13 Drawing Sheets

Fig. 7 (b)

| Bit (left to right) | Meaning if bit set to 1 |
|---|---|
| URG | Urgent pointer field is valid |
| ACK | Acknowledgement field is valid |
| PSH | This segment requests a push |
| RST | Reset the connection |
| SYN | Synchronize sequence number |
| FIN | Sender has reached end of its byte stream |

COMMUNICATIONS SYSTEM

BACKGROUND OF THE INVENTION

1. Field of the Invention

The present invention relates to an apparatus for transmitting and receiving image data, voice data, and other supplementary data over a network, and more particularly to a communications system capable of maintaining the real time requirement of such data.

2. Description of the Related Art

In recent years, with increasing performance of microcomputers and the advent of OSs equipped with networking capabilities, coupled with increasing speeds of peripheral interfaces and increasing performance of computers, dramatic changes have been occurring in the field of computers, particularly personal computers and work stations, these changes entailing changes in information that computers handle. Earlier, information handled by computers was character code, such as ASCII and JIS, but gradually expanded to include graphics and the like in the field of CAD, and nowadays, handling of multimedia information such as moving images and voice is increasing in importance. The most notable feature of multimedia information is that information occurs continuously in real time (hereinafter referred to as the real time requirement). On the other hand, with the spread of high-speed wide area networks, networks are being commercially implemented that store and manage such multimedia data and that have fast data transfer rates that enable such data to be launched into the networks.

What characterizes such networks is that when transmitting signals having the real time requirement over the network, the transmitting end must send out data not later than the time expected at the receiving end.

One example of a network suitable for multimedia communications is the ATM (Asynchronous Transfer Mode) network. With ATM, transmission systems capable of 156 Mbit/s, for example, have been commercially implemented. ATM specifications are being discussed and standardized by the ITU-T (International Telecommunications Union-Telecommunication Standardization Sector), the ATM Forum, etc., and many related books have been published. Besides ATM, there are other techniques, such as 100-Mbps Ethernet (100BASE-T) and Fiber Distributed Data interface (FDDI), that can provide fast transmission capabilities of 100 Mbit/s or higher and can achieve multimedia information communications. With slower versions of Ethernet (IEEE 802.2, IEEE 802.3) also, since switching hubs are now readily available, each terminal connected to the switching hub is capable of a transmission rate of about 10 Mbit/s and is therefore able to transmit real time signals that do not require data rates higher than that. In the Internet also, signals having real time requirements, such as videoconferencing and Internet telephone signals, are being transmitted.

Prior art examples of communications systems for real time signals are disclosed, for example, in Japanese Patent Unexamined Publication Nos. 7-170502, 7-170503, 7-170290, 7-170291, 7-170504, and 7-170292.

Japanese Patent Unexamined Publication No. 7-170502 discloses a system in which, when the amount of video or voice data in a buffer memory at the receiving end exceeds an upper limit value or drops below a lower limit value, the buffer memory is controlled in such a manner as to discard portions of the video or voice data other than critical portions thereof.

Japanese Patent Unexamined Publication No. 7-170503 concerns a system in which, when the amount of video or voice data in the buffer memory at the receiving end exceeds an upper limit value or drops below a lower limit value, the clock rate for buffer read is adjusted.

Japanese Patent Unexamined Publication No. 7-170290 describes a system in which, when the amount of voice data in the buffer memory at the receiving end exceeds an upper limit value or drops below a lower limit value, a control signal is sent to alert the transmitting end, and at the transmitting end the clock rate for memory read is adjusted.

Japanese Patent Unexamined Publication No. 7-170291 proposes a system in which, when the amount of voice data in a buffer memory at the transmitting end exceeds an upper limit value or drops below a lower limit value, video and voice data in the buffer memory are discarded.

Japanese Patent Unexamined Publication No. 7-170504 provides a system in which a frame buffer is placed in front of the buffer memory at the transmitting end and, when the amount of data in the buffer memory exceeds an upper limit value or drops below a lower limit value, the amount of data is adjusted by adjusting the clock rate of the frame buffer memory.

Japanese Patent Unexamined Publication No. 7-170292 discloses a system in which, when the amount of voice data in the buffer memory at the transmitting end exceeds an upper limit value or drops below a lower limit value, the clock rate for memory read is adjusted, and when the amount of voice data in the buffer memory at the transmitting end exceeds an upper limit value or drops below a lower limit value, the amount of communication is controlled by changing the compression ratio.

However, the prior art systems disclosed in Japanese Patent Unexamined Publication Nos. 7-170502, 7-170503, 7-170290, 7-170291, 7-170504, and 7-170292 have had the problem that the system size increases because of the provision of extra circuitry such as a circuit for measuring the amount of buffer contents, a circuit for manipulating the discarding of buffer contents, a circuit for judging mathematical operations, and a circuit for specifying compression parameters necessary for obtaining the desired image compression ratio.

Furthermore, since the degree of network congestion varies over time, there can occur cases where data cannot be handled at one or more exchange points, etc. resulting in overflow. Generally, when a network falls into such a condition, the amount of transmission is reduced to alleviate the condition. The above prior art systems have had the problem that, when the transmission capacity is restricted, it becomes impossible to maintain the real time requirement of real time signals or image quality degrades more than necessary.

The present invention has been devised to overcome the above-outlined problems, and it is an object of the invention to provide a communications system that is simple in configuration and that, when transmitting digital data having a real time requirement such as a moving image (video) signal or voice signal, ensures transmission of all frames without compromising the real time requirement of the data.

SUMMARY OF THE INVENTION

To resolve the above problems, the present invention provides a communications system for communication of a real time signal having a real time requirement, comprising:

real time signal generating means for generating the real time signal of data rate R;

real time signal transmit buffer means for temporarily storing the real time signal;

real time signal transmitting means for transmitting the real time signal;

transmission means, having a transmission rate C (C>R), over which the real time signal is transmitted;

real time signal receiving means for receiving the real time signal transmitted from the real time signal transmitting means over the transmission means;

real time signal receive buffer means for temporarily storing the real time signal received by the real time signal receiving means; and real time signal outputting means for outputting the real time signal stored in the real time signal receive buffer means.

DESCRIPTION OF THE PREFERRED EMBODIMENTS

Figure 1:
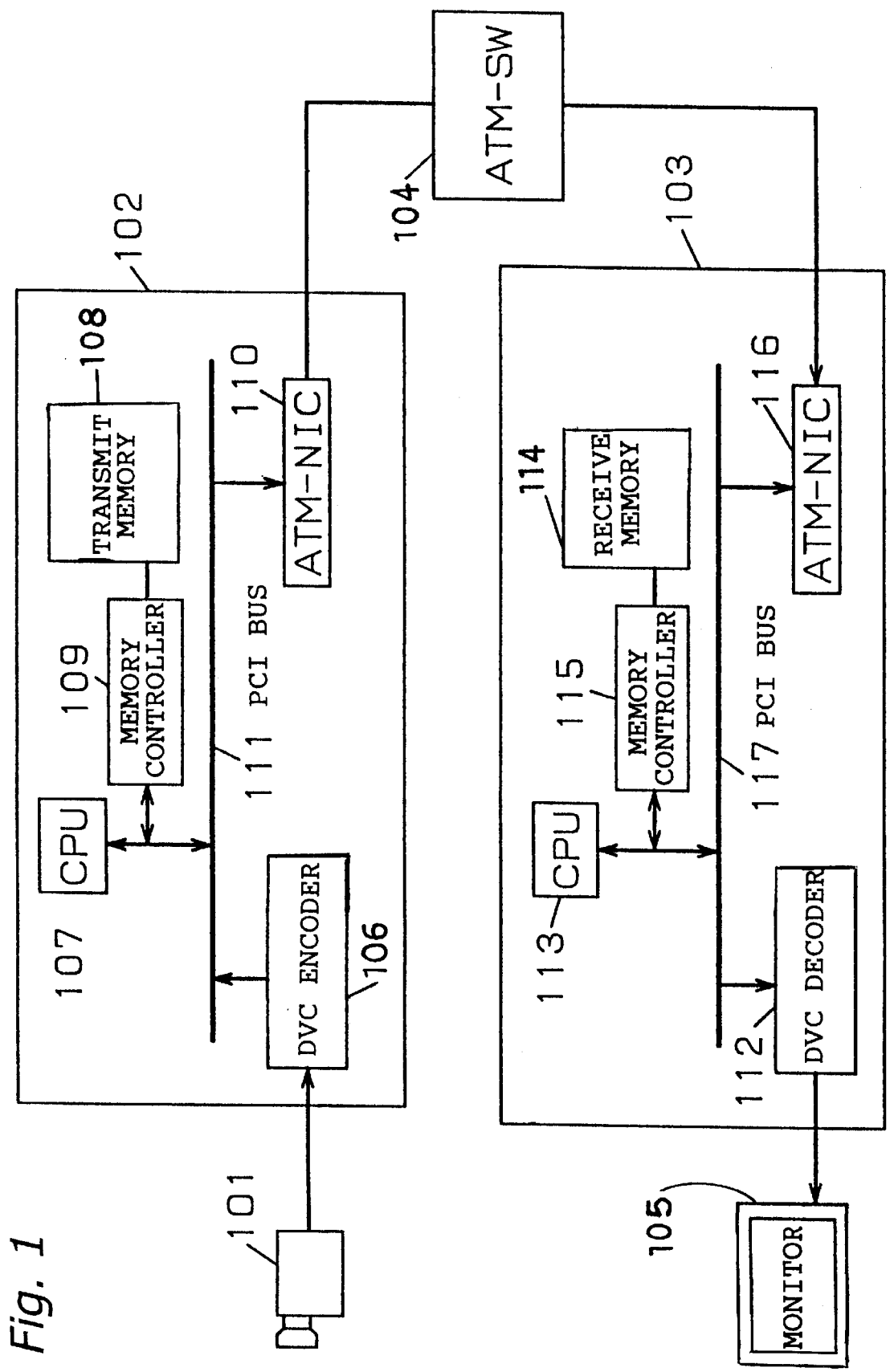
FIG. 1 is a diagram showing the configuration of a communications system according to a first embodiment of the present invention.

The preferred embodiments of the present invention will be described below with reference to the accompanying drawings.

The real time signal contemplated by the present invention can be applied to any signal having a real time requirement, such as a moving image signal or a voice signal, but in the embodiments of the present invention, a digitized moving image signal is taken as an example of the real time signal, unless otherwise stated.

Further, the present invention is applicable regardless of the quality of the transmitted moving image which is determined by the number of samples in the horizontal and vertical directions relating to the resolution of the moving image or by whether compression is applied or not and, if compression is applied, then by the type of compression applied. That is, the present invention is applicable regardless of the bit rate of the transmitted real time signal.

In the embodiments of the present invention, an image signal employing the sampling method and compression method used in VTRs manufactured to the DVC standard is taken as an example.

DVC is an acronym for Digital Video Cassette, and the DVC standard was agreed upon by the HD Digital VCR Consortium. This standard is described, for example, in a magazine "National Technical Report", Vol. 41, No. 2, April 1995, pp. 152–159. In the embodiments of the present invention, the NTSC signal compliant with the DVC standard is taken as an example. According to the method defined by the DVC standard (NTSC signal), the data bit rate is 28.8 Mbit/s (hereinafter described as 28.8 Mbps).

Any transmission means may be used as long as it has a transmission capacity greater than the bit rate of the real time signal used, but in the embodiments of the present invention, an ATM network having a transmission rate of 156 Mbit/s is used as the transmission means; further, as a network protocol, a scheme called IP over ATM is used that is defined in RFC 1577 and that realizes a virtual IP network, and as higher layer protocols, TCP/IP (Transmission Control Protocol/Internet Protocol), now the standard suite of protocols for the Internet, is used in the examples described herein.

Generally, the lowest level in a communications network provides unreliable packet delivery. If a transmission error occurs that affects the data, or if the network load becomes too heavy to be handled properly, packets may be lost or destroyed. In a network that dynamically routes packets, the packets may be delivered out of order, may be duplicated, or may even arrive after a large delay. Therefore, at the highest level, programmers are required to incorporate error detection and recovery into application programs to achieve transmission of large volumes of data.

TCP/IP uses the basic technique called the positive acknowledgement with retransmission to provide reliable transmission. This technique requires that the receiver communicate with the sender and return an acknowledgement (ACK) message each time data is received. The sender maintains records of each transmitted packet, and sends the next packet after an acknowledgement arrives. The sender also activates a timer when sending a packet and, if the timer has timed out before arrival of an acknowledgment, retransmits the packet.

Figure 7:
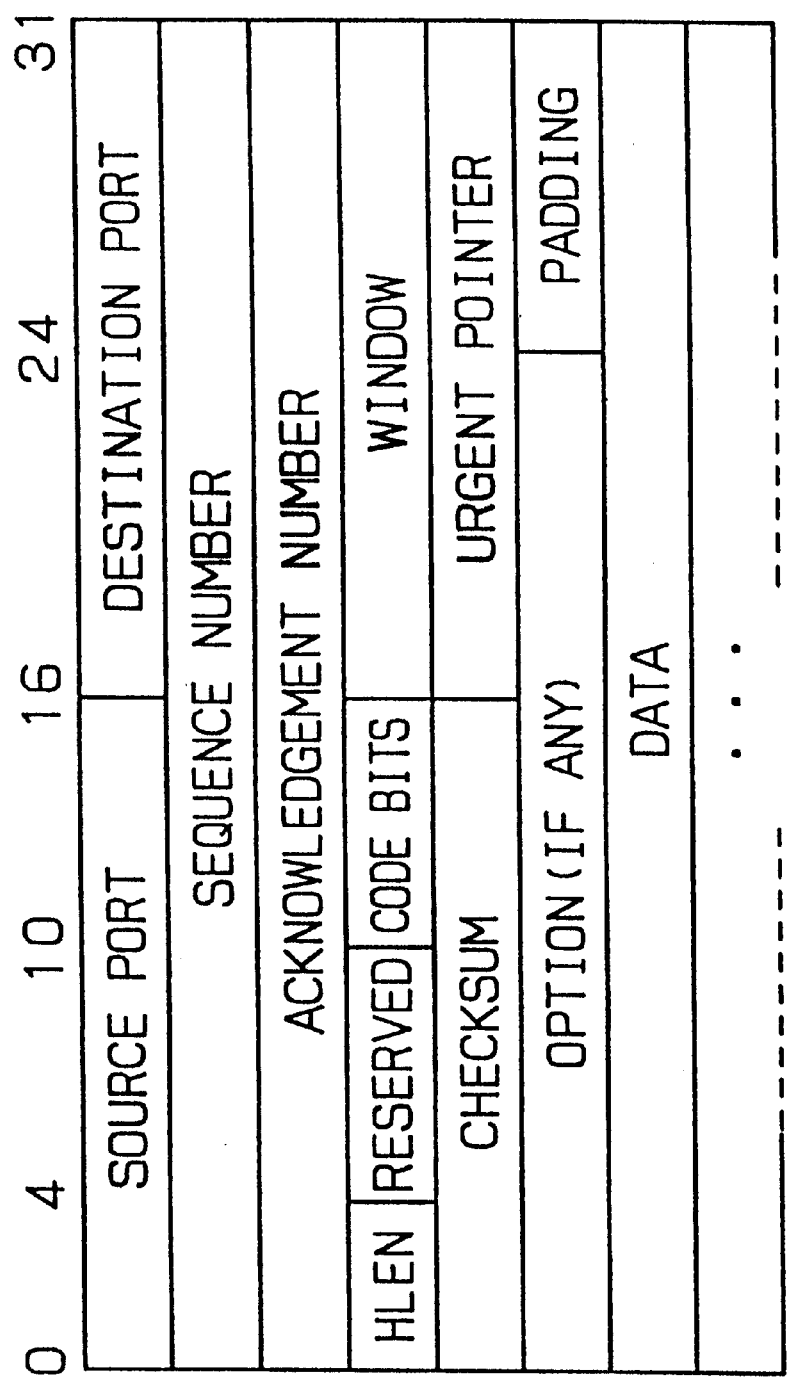
FIGS. 7a–7b are diagrams showing a TCP segment format.

The transfer unit used by TCP is called a segment. FIG. 7(a) illustrates the TCP segment format. Each segment is divided into two areas, the header and the data area. The header is known as the TCP header and carries expected identification and control information. The SOURCE PORT field and the DESTINATION PORT field contain the TCP port numbers identifying application programs at both ends of the connection. The SEQUENCE NUMBER field identifies the position in a byte stream of the sender's data contained in the segment. The ACKNOWLEDGEMENT NUMBER field identifies the beginning of the sequence number expected to be received next (the next octet to be received). Since the TCP header length varies depending on the options selected, the HLEN field indicates the offset of the data area in the segment. The six-bit field labeled RESERVED is set aside for future use. The TCP segment may be used to carry a connection setup or connection clear request or to carry only an acknowledgement or data. The six-bit field labeled CODE BITS is used to determine the purpose and contents of the segment. More specifically, the CODE BITS field dictates the way how the other fields in the header are to be interpreted in accordance with the table shown in FIG. 7(b). The WINDOW field tells the amount of data the receiving end is willing to accept, by specifying the buffer size each time a segment is sent. Data that needs immediate processing is called urgent data. If the urgent code bit is on, that means that this segment contains urgent data. The URGENT POINTER field carries a pointer that indicates the position where the urgent data ends. The CHECKSUM field in the TCP header contains an integer checksum used to verify the integrity of the TCP header and the data. The OPTIONS field is used for expanded TCP specifications, for example, but it is usually used to notify the remote end of the maximum receivable segment size.

As previously described, TCP/IP uses the technique called the positive acknowledgement; however, in a simple positive acknowledgement protocol, since transmission of the next packet has to wait until a positive acknowledgement for the previous packet is received, the available bandwidth of the network is wasted. To address two important problems of efficient transfer and flow control, TCP uses a special mechanism called a sliding window. In this method, a fixed-length window is set in the sequence, and all packets inside the window are transmitted at a time. For example, in a sliding window protocol of window size 8, the sender is allowed to transmit eight packets before an acknowledgement is received. After the sender receives an acknowledgement for the first packet, the sender slides the window and sends another packet. The window continues to slide as long as an acknowledgement is received. In this case, the number of packets that may be remaining unacknowledged at any given time is limited by the window size, and is restricted to a small predetermined value. Further, when the remaining capacity of the receiving buffer becomes low, for example, the amount of data being transmitted from the remote end can be reduced by reducing the window size value. TCP performs flow control by using this value.

There are two major causes for the loss of a TCP segment transferred over a network. One is a sporadic error. This, however, is not common in LANs and WANs where line quality is good. The other is the existence of a bottleneck such as a low-speed line or low-processing capacity router in the path through which the TCP segment is carried. A condition in which a critical delay is caused by overload with datagrams at one or more exchange points such as routers is called congestion. Once congestion occurs, the delay increases and the router begins to queue datagrams until they can be routed out. In the worst case, the total number of datagrams arriving at the congested router reaches the limit of the router's capacity and the router begins to drop datagrams. Usually, an end point has no detailed idea of where and how the congestion has occurred, and the congestion simply manifests itself as an increased delay at the end point. The increased delay, in turn, causes the transport protocol to request retransmissions due to timeouts, further increasing the traffic on the network and exacerbating the congestion. This condition is called congestion collapse.

To avoid congestion collapse, in TCP it is recommended to use two techniques, slow start and multiplicative decrease congestion avoidance.

In multiplicative decrease congestion avoidance, a second restriction called a congestion window is provided to control congestion, and anytime, TCP compares the receiver's window size (buffer size) with the congestion window size and uses the smaller window in transmission. Each time a segment loss is detected, the congestion window size is reduced by one half (the minimum value is 1 segment) and the timeout interval is doubled. This strategy provides a quick and significant decrease in traffic and allows a sufficient time to clear the datagrams already queued at the router.

When it is determined that the congestion has ended, TCP initializes the congestion window to 1, sends the first segment, and waits for an acknowledgement. Thereafter, the congestion window is increased by one segment each time an acknowledgement arrives. This technique is called slow start.

To prevent the window size from increasing too rapidly and thereby causing congestion again, TCP provides a still another restriction. That is, when the congestion window size reaches one half of its original size, TCP enters a congestion avoidance stage and reduces the increasing speed of the congestion window size. During the congestion avoidance period, the congestion window is increased only by 1 even if the acknowledgements for all the segments in the window are received.

The above has described the process in TCP from the occurrence of congestion to the recovery from the congestion. While this process is in progress, the network can only transmit data at a lower transmission rate than its actual transmission capacity and imposes extra loads on end points. This presents a problem, especially when transmitting real time signals. That is, the real time signals cannot be delivered in time and the real time requirement is impaired.

In the present invention, the number of frames of a real time signal accumulated in advance at the receiving end can be applied to any signals having real time requirements. In the embodiments of the present invention, description will be given by taking a digitized moving image signal as an example, unless otherwise stated.

(Embodiment 1)

FIG. 1 shows a system configuration according to a first embodiment of the present invention. In FIG. 1, reference numeral 101 is a camera for capturing a moving image, 102 is a transmitting terminal, 103 is a receiving terminal, 104 is an ATM switch, and 105 is a monitor.

In the transmitting terminal 102, reference numeral 106 is a DVC encoder for applying DVC compression, 107 is a CPU, 108 is a transmit memory for temporarily storing transmit data and a control program for the transmitting terminal 102, 109 is a memory controller for controlling the transmit memory 108, 110 is an ATM network interface card (ATM-NIC), and 111 is a PCI bus.

In the receiving terminal 103, reference numeral 112 is a DVC decoder, 113 is a CPU, 114 is a receive memory for temporarily storing received data and a control program for the receiving terminal 103, 115 is a memory controller for controlling the receive memory 114, 116 is an ATM network interface card (ATM-NIC), and 117 is a PCI bus.

The operation of the thus configured communications system will be described below.

First, in the transmitting terminal 102, the moving image signal from the camera 101 is input into the DVC encoder 106 where DVC compression is applied on a frame by frame basis. Since the NTSC signal consists of 30 frames per second, data for 30 frames per second is obtained in the embodiment of the present invention. The DVC data output from the DVC encoder is stored frame by frame in the transmit memory 108 via the PCI bus under the control of the memory controller 109. Then, the DVC data stored in the transmit memory 108 is transferred to the ATM-NIC 110 via the PCI bus.

With the above-described processing in the transmitting terminal 102, the moving image data from the ATM-NIC 110 is transmitted over the ATM network to the receiving terminal 103 via the ATM switch 104.

Next, processing at the receiving terminal 103 will be described.

First, at the receiving terminal, the data received by the ATM-NIC is stored in the receive memory 114 via the PCI bus. The DVC data stored in the receive memory 114 is then transferred frame by frame to the DVC decoder 112, where the compressed image data is decoded into a decompressed image signal, which is output to the monitor 105.

In FIG. 1, the DVC encoder 106 and the DVC decoder 112 operate with clocks of the same frequency.

Next, the processing at the transmitting terminal 102 described with reference to FIG. 1 will be explained from the standpoint of the control program with reference to FIG. 2.

Figure 2:
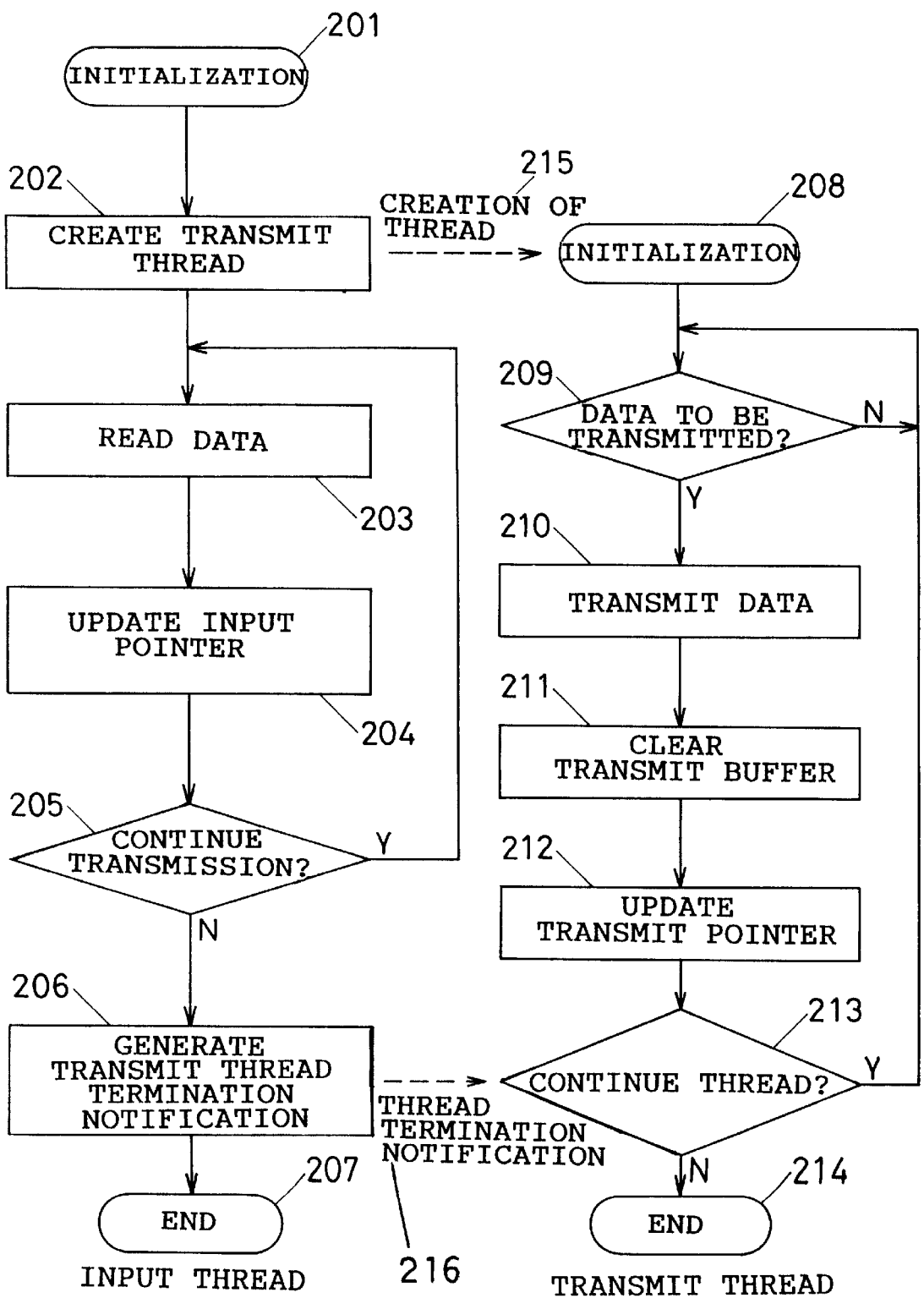
FIG. 2 is a flow chart illustrating a control program in a transmitting terminal 102 according to the first embodiment of the invention.

FIG. 2 is a flow chart of the control program of the transmitting terminal 102. This program is stored in the memory 108 and executed by the CPU 107.

The control program of the transmitting terminal 102 executes two threads, an input thread and a transmit thread, in time division fashion to accomplish the transmitting process. At this time, a transmit buffer is used to temporarily store the DVC data, and the transmit buffer is accessed in accordance with an input pointer pointing to the storage location (address) where data is to be stored and a transmit pointer pointing to the storage location (address) where data to be transmitted is stored. The transmit buffer is implemented, for example, as part of the memory 108.

The thread here is the most basic unit in terms of which the operating system assigns the processor's execution time.

Previously, many multitasking operating systems such as UNIX employed a process as a basic unit, but in recent UNIX and Windows NT, multiple threads can be allocated to one process, and most of the functions implemented by multiprocessing can now be implemented by multithreading. In previous systems using multiprocessing, information on all resources, including virtual memory space, is stored temporarily, and interprocess communication is necessary in order to share the information between processes; here, the performance of the interprocess communication becomes a bottleneck that limits the overall performance of the system. In the case of multithreading, on the other hand, since many memory spaces including virtual memory space are shared, this kind of bottleneck can be avoided.

Figure 4:
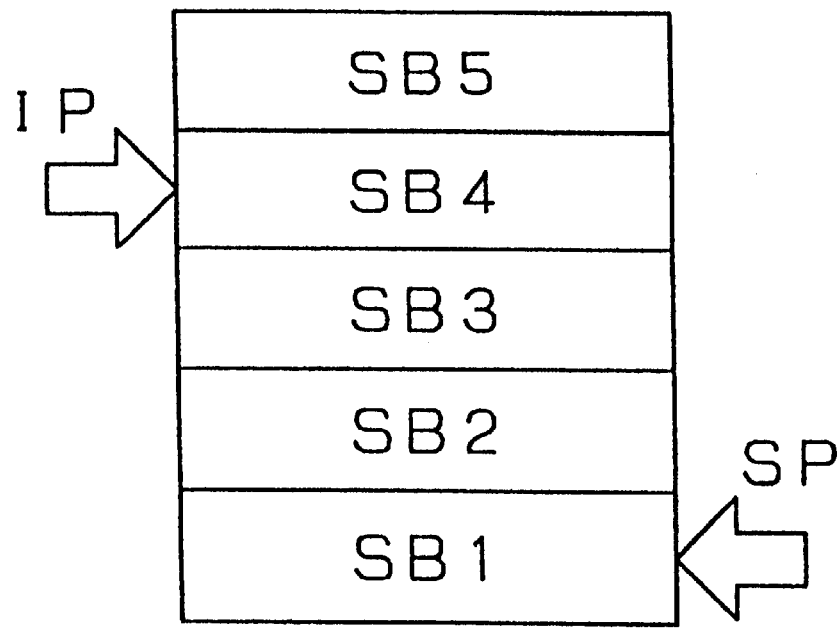
FIGS. 4a–4b are conceptual diagrams showing a frame data buffer used in the first embodiment of the invention.
Figure 4:
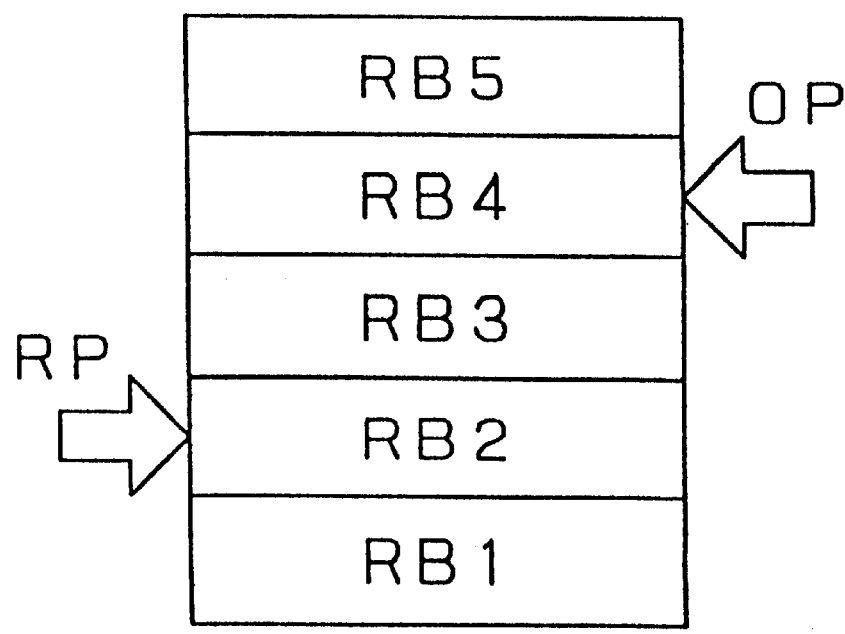

FIG. 4(*a*) shows a conceptual diagram of the transmit buffer. The buffer has a so-called queue structure. SB1 to SB5 are buffer sections where data are actually stored, and IP indicates the input pointer and SP the transmit pointer. The initial values of the input pointer and transmit pointer are both SB1. The input pointer IP is updated each time data for one frame is read from the DVC encoder 106 and stored in a buffer section. On the other hand, the transmit pointer SP is updated each time data in a buffer section is transmitted out onto the network. More specifically, the input pointer and the transmit pointer both move from one buffer section to the next as they are updated, that is, from SB1 to SB2, then from SB2 to SB3, and returning to SB1 after SB5.

In the present invention, the transmit buffer can be of any size as long as it is larger than the receive buffer. In the example shown here, the transmit buffer size is set to five frames.

The actual transmitting process will be described below with reference to FIG. 2. In the input thread, processing is performed in 201, such as establishing a logical connection with the receiving terminal 103 and securing and initializing the transmit buffer. Next, in 202, the transmit thread is created. Then, in 203, frame data generated by the DVC encoder 106 is written to the transmit buffer at the address indicated by the input pointer. In 204, the input pointer is updated to point to the transmit buffer address at which the next data is to be stored. Conditional branches are provided at 205 where it is determined whether the transmitting process is to be continued or not. If it is to be continued, the process from 203 onward is repeated. If it is determined in 205 that the transmitting process is not to be continued, a transmit thread termination notification is generated in 206 to cause the transmit thread to terminate, and at the same time, the execution of the input thread is terminated in 207.

The transmit thread is created in step 202 in the input thread. First, in 208, processing such as initialization of the transmit pointer is performed. If it is determined in 209 that there is frame data at the transmit buffer address indicated by the transmit pointer, then the data is transmitted out in 210. After the data is transmitted out, the contents of the buffer indicated by the transmit pointer are cleared in 211, and in 212 the transmit pointer is updated to point to the transmit buffer address at which the next data to be transmitted is stored. Conditional branches are provided at 213 where it is determined whether the transmit thread is to be continued or not. If it is to be continued, the process from 209 onward is repeated. On the other hand, if the transmit thread termination notification 216 is received, the execution of the thread is stopped, and the transmit thread is terminated in 214.

Next, the processing at the receiving terminal 103 described with reference to FIG. 1 will be explained from the standpoint of the control program with reference to FIG. 3.

Figure 3:
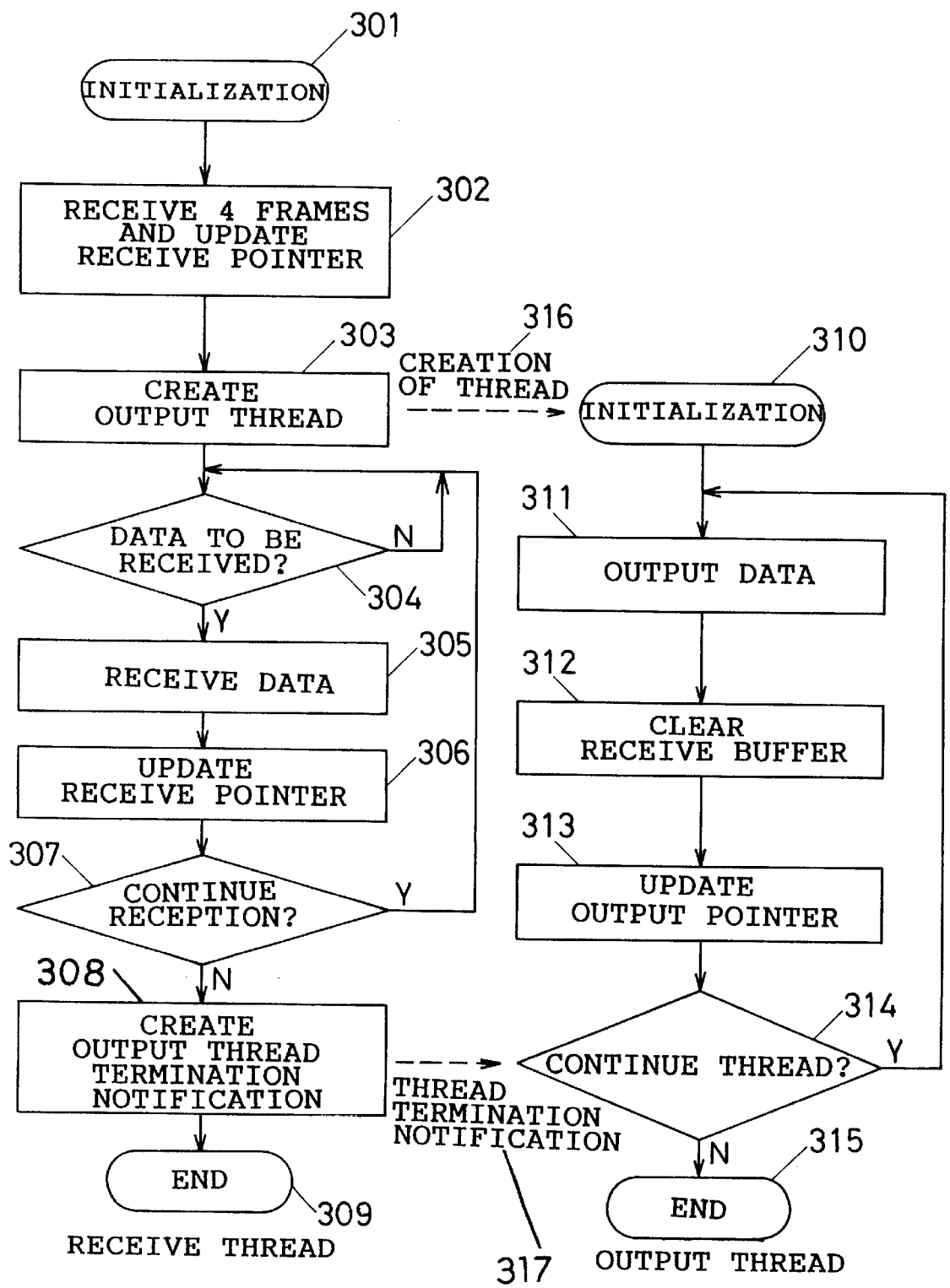
FIG. 3 is a flow chart illustrating a control program in a receiving terminal 103 according to the first embodiment of the invention.

FIG. 3 is a flow chart of the control program of the receiving terminal 103. This program is stored in the memory 114 and executed by the CPU 113. The control program of the receiving terminal 103 executes two threads, a receive thread and an output thread, in time division fashion to accomplish the receiving process. At this time, a receive buffer is used to temporarily store the DVC data, and the receive buffer is accessed in accordance with a receive pointer pointing to the storage location (address) where the received data is to be stored and an output pointer pointing to the storage location (address) where data to be output is stored. The receive buffer is implemented, for example, as part of the memory 114.

FIG. 4(*b*) shows a conceptual diagram of the receive buffer. This buffer has the same structure as the previously described transmit buffer structure. RB1 to RB5 are buffer sections where data are actually stored, and RP indicates the receive pointer and OP the output pointer. The initial values of the receive pointer RP and output pointer OP are both RB1. The receive pointer RP is updated each time data is received from the network and stored in a buffer section, and the output pointer OP is updated each time data in a buffer section is output to the DVC decoder 112. More specifically, the receive pointer and the output pointer both move from one buffer section to the next as they are updated, that is, from RB1 to RB2, then from RB2 to RB3, and returning to RB1 after RB5.

In the present invention, the receive buffer size and the number of frames of a real time to be accumulated in advance are arbitrary within the range that does not impair the real time requirement of the signal. In the example shown here, the receive buffer size is set to five frames and the number of frames to be accumulated in advance is set to four frames.

In the receive thread, processing is performed in 301, such as establishing a logical connection with the transmitting terminal 102 and securing and initializing the receive buffer. Next, in 302, frame data is received, the frame data is written to the receive buffer at the address indicated by the receive pointer, and then the receive pointer is updated; this sequence of processing is repeated for four successive frames. Next, the output thread is created in 303. If, in 304, there is frame data to be received, then in 305 the data is received and written to the receive buffer at the address indicated by the receive pointer. Then, the receive pointer is updated in 306.

Conditional branches are provided at 307 where it is determined whether the receiving process is to be continued or not. If it is to be continued, the process from 304 onward is repeated. On the other hand, if it is determined in 307 that the receiving process is not to be continued, an output thread termination notification is generated in 308 to cause the output thread to terminate, and at the same time, the execution of the receive thread is terminated in 309.

The output thread is created in step 303 in the receive thread. First, in 310, processing such as initialization of the output pointer is performed. Next, in 311, frame data at the address indicated by the output pointer is transferred from the receive buffer to the DVC decoder 112 shown in FIG. 1. The transferred frame data is decoded and output to the monitor 105 shown in FIG. 1. Then, in 312, the contents of the receive buffer indicated by the receive pointer are cleared, and in 313 the output pointer is updated to point to the receive buffer address at which the next data to be output is stored. Conditional branches are provided at 314 where it is determined whether the output thread is to be continued or not. If it is to be continued, the process from 311 onward is repeated. On the other hand, if the output thread termination notification is received, the execution of the thread is stopped, and the output thread is terminated in 315.

Figure 5:
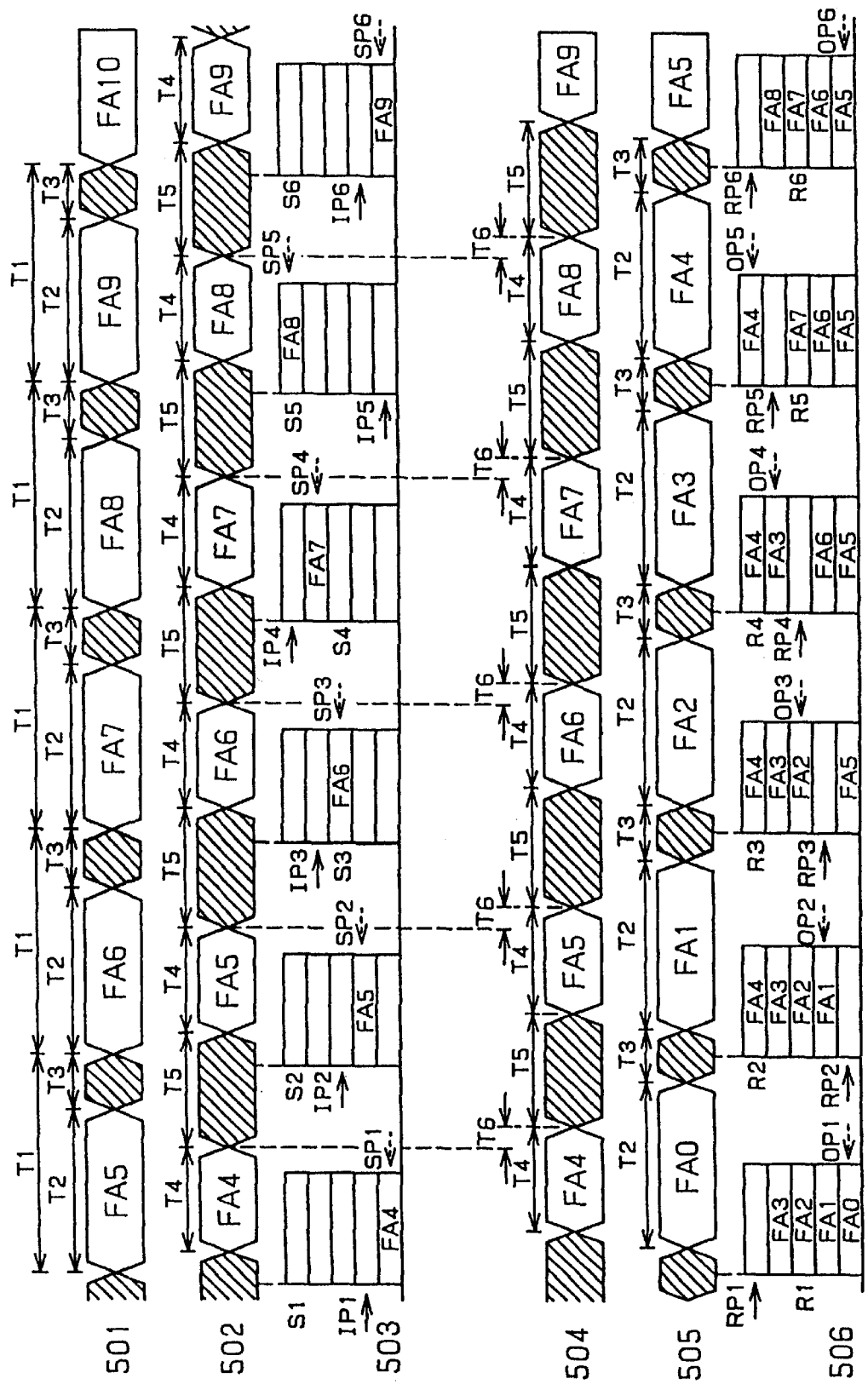
FIG. 5 is a timing chart showing the operation in a normal condition according to the first embodiment of the invention.
Figure 6:
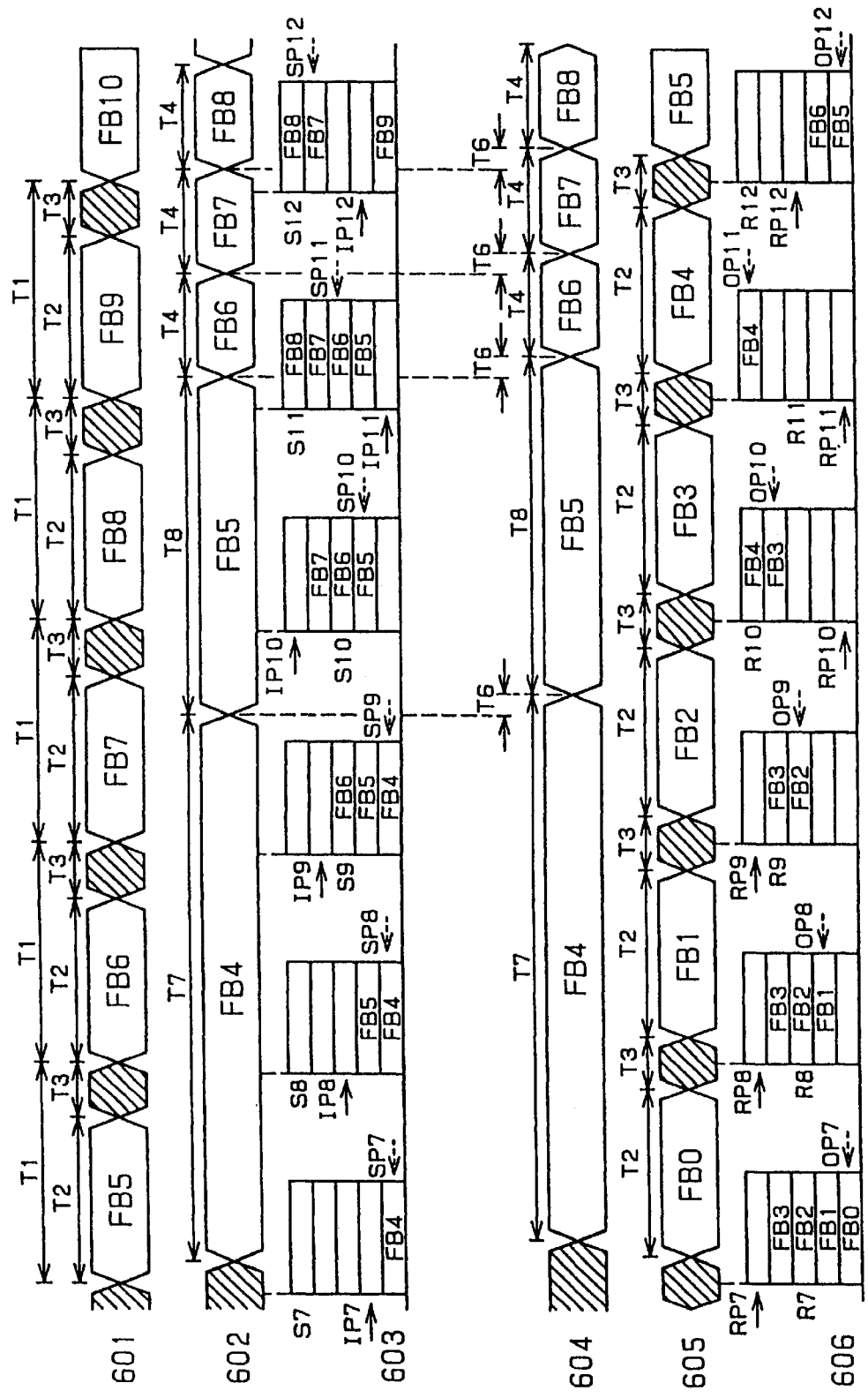
FIG. 6 is a timing chart showing the operation in a congested condition according to the first embodiment of the invention.

FIGS. 5 and 6 are timing charts according to the embodiment of the present invention. FIG. 5 is a timing chart in a normal operating condition, and FIG. 6 is a timing chart when the transmission capacity of the network is temporarily restricted due to congestion, etc. In FIGS. 5 and 6, 501 and 601 indicate the timing for reading data from the DVC encoder at the transmitting terminal, 502 and 602 the timing for transmission to the network, 503 and 603 the state of the transmit buffer, 504 and 604 the timing at the receiving terminal for receiving data from the network, 505 and 605 the timing for outputting frame data to the DVC decoder, and 506 and 606 the state of the receive buffer. The hatched portions in FIGS. 5 and 6 are data invalid portions where actual real time signal data is not handled. Data valid portions are each shown without breaks, but in actual communications, data is transmitted in an intermittent manner; accordingly, the valid portions in FIGS. 5 and 6 mean portions during the period of which valid data is transmitted.

Here, since transmission delays, fluctuations, etc. do not affect the essential characteristics of the present invention, for simplicity the timing charts assume conditions of a constant delay and no fluctuations.

First, the embodiment of the present invention will be described with reference to the timing chart of FIG. 1 illustrating the normal operating condition.

Symbols FA0 to FA10 in the figure designate frame data being handled at the respective times, the same symbol indicating the same frame data.

Reference numeral 501 shows the timing for reading real time signal data from the DVC encoder 106 at the transmitting terminal 102. As shown by 501, the data is read into the transmit buffer precisely at intervals of one frame period T1 (1000/30=33.3 [msec]). T2 denotes a valid data period during which valid data is read from the DVC encoder 106, and T3 an invalid data period. T2 and T3 are both constant values such that T2+T3=T1. That is, in practice there is no need to read data into the transmit buffer during the period T3.

Reference numeral 502 shows the transmit timing for the real time signal data transmitted out onto the network by the ATM-NIC 110 at the transmitting terminal 102. As shown by 502, T4 is a valid data portion for the transmit data and T5 is an invalid portion (T4+T5=T1). The ratio of T4 to T5 is determined by the bit rate of the transmit data and the transmission capacity of the network including the NIC. As is apparent, transmission of real time signals requires that the transmission capacity of the network be greater than the bit rate of the data actually transmitted in the normal operating condition. This means that valid data is transmitted in a time interval shorter than one frame time interval (T4<T1).

Shown at 503 is a schematic diagram illustrating the state of the transmit buffer at the transmitting terminal 102, starting from the time at the left edge of the diagram. S1 to S6 designate the buffer sections, and FA4 to FA9 in the diagram indicate the frame data stored in the buffer at the respective times and the position of that data. Further, arrows IP1 to IP6 in the diagram indicate the position of the input pointer at the respective times, and likewise, SP1 to SP6 indicate the position of the transmit pointer.

Reference numeral 504 shows the receive timing for the real time signal data that the ATM-NIC 116 at the receiving terminal 103 receives from the network. Since it is assumed that the transmission delay is constant, and no fluctuations are considered, the valid data and invalid data periods are the same in length as T4 and T5, respectively, in the transmit timing. T6 indicates the transmission delay with respect to the transmit timing.

Reference numeral 505 shows the timing for outputting the real time signal data to the DVC decoder 112 at the receiving terminal 103. As shown by 505, the data is read from the receive buffer precisely at intervals of one frame period T1. As in the read timing at the transmitting terminal 102, T2 denotes a valid data period during which valid data is transferred to the DVC decoder 112, and T3 an invalid data period, T2 and T3 both being constant values. That is, in practice there is no need to transfer data to the DVC decoder 112 during the period T3.

Shown at 506 is a schematic diagram illustrating the state of the receive buffer at the receiving terminal, starting from the time at the left edge of the diagram. R1 to R6 designate the buffer sections, and FA0 to FA8 in the diagram indicate the data stored in the buffer at the respective times and the position of that data. Further, arrows RP1 to RP6 in the diagram indicate the position of the receive pointer at the respective times, and likewise, OP1 to OP6 indicate the position of the output pointer.

Next, the condition where the transmission capacity of the network is temporarily restricted due to congestion, etc. will be described with reference to the timing chart shown in FIG. 6. Symbols FB0 to FB10 in the figure designate frame data being handled at the respective times, the same symbol indicating the same frame data.

Reference numeral 601 shows the timing for reading real time signal data from the DVC encoder 106 at the transmitting terminal 102. As in the case of FIG. 5, the data is read into the transmit buffer precisely at intervals of one frame period T1. T2 denotes a valid data period during which valid data is read from the DVC encoder 106, and T3 an invalid data period, T2 and T3 both being constant values.

Reference numeral 602 shows the transmit timing for the real time signal data transmitted out onto the network by the ATM-NIC 110 at the transmitting terminal 102. Unlike the case of FIG. 5, in FIG. 6 time T7 (T7>T1) is required for the transmission of FB4 because the transmission capacity of the network is restricted during congestion. When the congested condition is cleared, the transmission capacity gradually recovers as a result of the previously described congestion control, so that transmission of the next frame data FB5 takes time T8 (T7>T8>T1>T4). Starting with the transmission of frame data FB6, the network returns to the normal condition and each frame is transmitted in time T4. Further, since data continues to be transmitted as long as there is data in the transmit buffer indicated by the transmit pointer, valid data transmission continues without interposing data invalid portions, unlike the normal operating condition.

Shown at 603 is a schematic diagram illustrating the state of the transmit buffer at the transmit terminal 102, starting from the time at the left edge of the diagram. S7 to S12 designate the buffer sections, and FB4 to FB9 in the diagram indicate the data stored in the buffer at the respective times and the position of that data. Further, arrows IP7 to IP12 in the diagram indicate the position of the input pointer at the respective times, and likewise, SP7 to SP12 indicate the position of the transmit pointer. S7 to S12 in the diagram correspond to S1 to S6 in FIG. 5. In S1 to S6, the frame data accumulated in the buffer at any given time is only one that is stored in the buffer section indicate by the transmit pointer; on the other hand, in S7 to S12, since the next frame data is read into the buffer before the current frame data is sent out, data for multiple frames are stored, starting with S8.

Reference numeral 604 shows the receive timing for the real time signal data that the ATM-NIC 116 at the receiving terminal 103 receives from the network. Since it is assumed that the transmission delay is constant, and no fluctuations are considered, the data receiving time is the same as that in the transmit timing. T6 indicates the transmission delay with respect to the transmit timing.

Reference numeral 605 shows the timing for outputting the real time signal data to the DVC decoder 112 at the receiving terminal 103. As in the case of FIG. 5, the data is read from the receive buffer precisely at intervals of one frame period T1. As in the read timing at the transmitting terminal 102, T2 denotes a valid data period during which valid data is transferred to the DVC decoder 112, and T3 an invalid data period, T2 and T3 both being constant values.

Shown at 606 is a schematic diagram illustrating the state of the receive buffer at the receiving terminal 103, starting from the time at the left edge of the diagram. R7 to R12 designate the buffer sections, and FB0 to FB8 in the diagram indicate the data stored in the buffer at the respective times and the position of that data. Further, arrows RP7 to RP12 in the diagram indicate the position of the receive pointer at the respective times, and likewise, OP7 to OP12 indicate the position of the output pointer. R7 to R12 in the diagram correspond to R1 to R6 in FIG. 5. In R1 to R6, frame data for four frames are accumulated, from the buffer section indicated by the output pointer to the buffer section indicated by the receive pointer, at any given time, and the number of accumulated frames is thus constant. On the other hand, in R7 to R12, since frame data is output before the next frame data is received, the number of accumulated frames at each instant in time begins to decrease at R8 and, when recovered from the congestion at R12, begins to increase and continues to increase until four frames are accumulated, thus returning to the normal operating condition.

The important point of the present invention is that even when the transmission capacity is temporarily restricted due to congestion, etc. rendering it impossible to transmit a real time signal within the real time, since data are accumulated in advance at the receiving terminal the real time signal can be output without interruption as long as the accumulated data are output, and when recovered from the congestion, the valid data accumulated in the transmit buffer are transmitted successively until data for a prescribed number of frames are accumulated in the receive buffer as in the previous normal operating condition.

(Embodiment 2)

Figure 8:
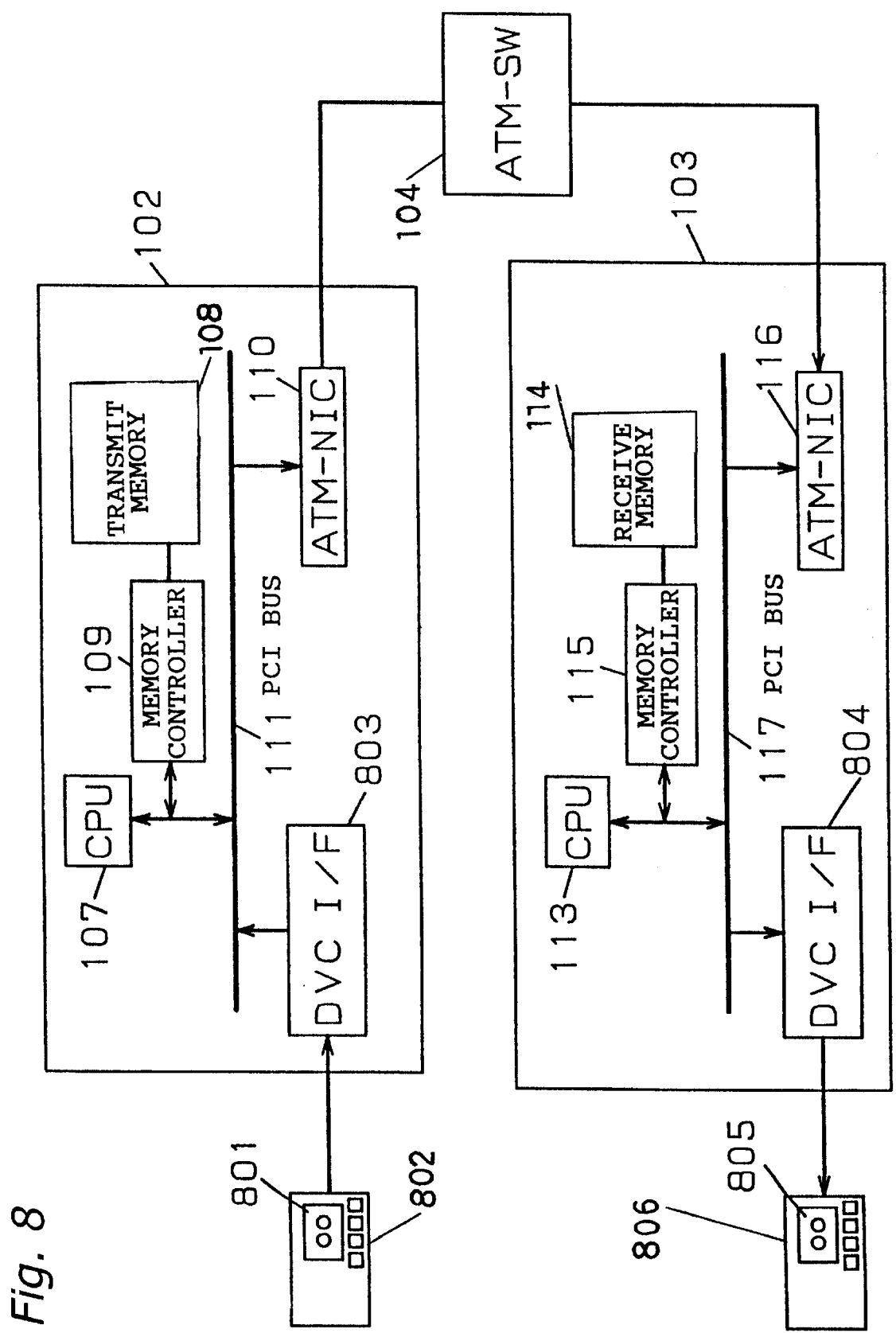
FIG. 8 is a diagram showing the configuration of a communications system according to a second embodiment of the present invention.

FIG. 8 is a block diagram showing a second embodiment of the present invention. In the figure, reference numeral 801 is a master tape on which a DVC-compressed digital signal is prerecorded, 802 is a DVC player for playing back the master tape 801 and for outputting the prerecorded digital signal, 803 is a DVC interface (DVC-I/F) for transferring the digital signal output from the DVC deck 802 into the memory 108 via the PCI bus 111, 804 is a DVC-IF for outputting via the PCI bus 117 the DVC data stored in the memory 114 at the receiving terminal, 805 is a subtape for recording the received DVC data, and 806 is a DVC recorder for recording the DVC data on the subtape 805. The same constituent elements as those in FIG. 1 are designated by the same reference numerals. In FIG. 8, the DVC player 802 and the DVC recorder 806 operate with clocks of the same frequency.

According to the above configuration, between remote terminals interconnected over an ATM network, all frame data on the master tape connected to the transmitting terminal can be copied onto the subtape connected to the receiving terminal without impairing the real time requirement.

(Embodiment 3)

Figure 9:
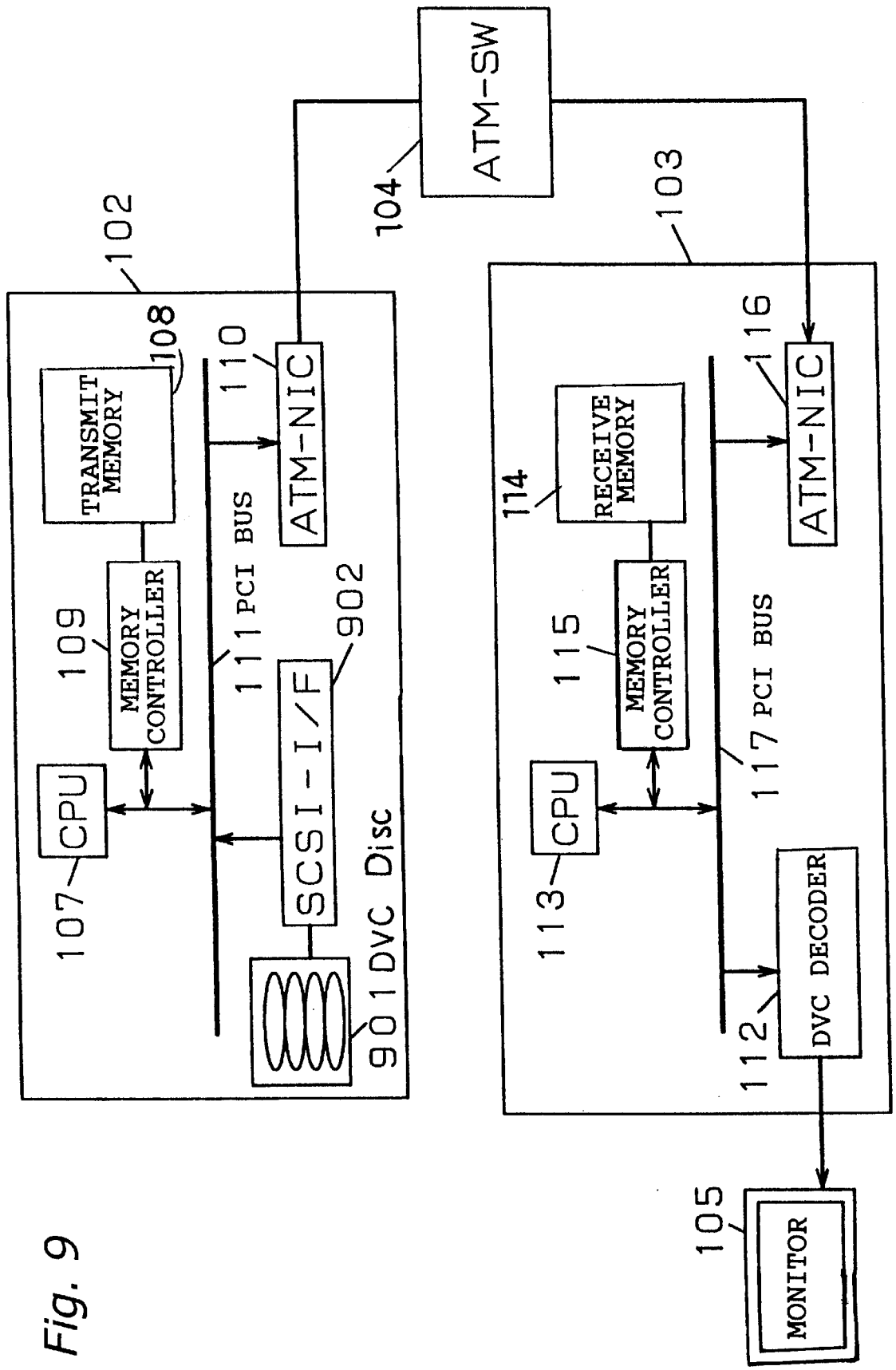
FIG. 9 is a diagram showing the configuration of a communications system according to a third embodiment of the present invention.

FIG. 9 is a block diagram showing a third embodiment of the present invention. In the figure, reference numeral 901 is a disk medium on which DVC-compressed data is prerecorded. Not only can the disk medium 901 be read faster than the real time of the recorded DVC data, but it also permits random access to the recorded data. Otherwise, the configuration is the same as that shown in FIG. 1, and the same constituent elements are designated by the same reference numerals between the two figures.

The disk medium 901 may be constructed from a semiconductor memory or the like as long as it permits random access and can be read faster than the real time of the recorded data.

Actual processing in this embodiment will be described with reference to FIGS. 10 and 11.

Figure 10:
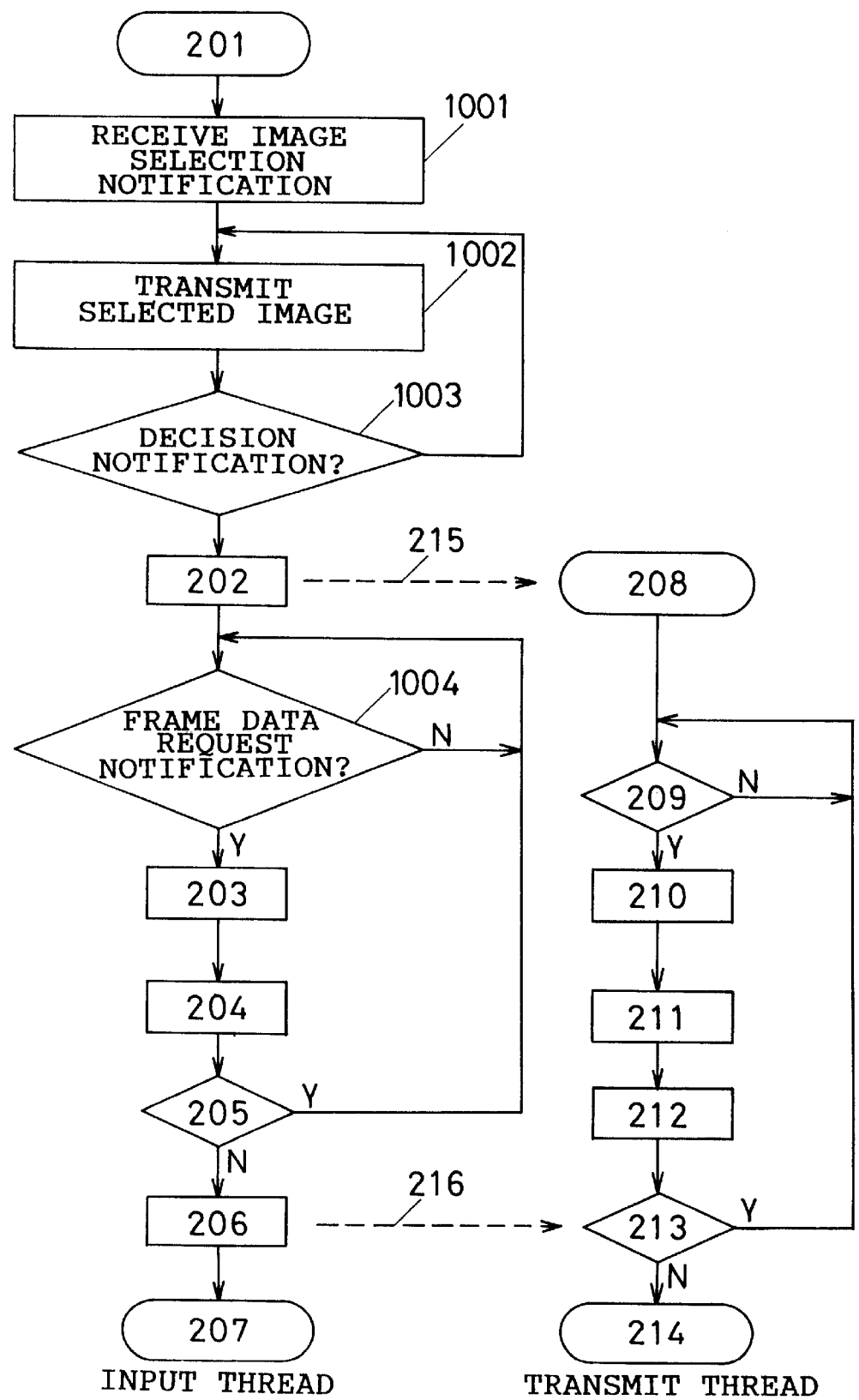
FIG. 10 is a flow chart illustrating a control program in a transmitting terminal 102 according to the third embodiment of the invention.

FIG. 10 is a flow chart illustrating the control program of the transmitting terminal 102. The same constituent elements as those in FIG. 2 are designated by the same reference numerals. The flow of this embodiment differs from that of FIG. 2 in that an image for transmission is selected before transmission because data at the transmitting terminal is recorded on a randomly accessible medium, and in that each time a frame data request is received, synchronization is established with the receiving terminal 103 by sending data, since the medium can be read faster than the real time.

First, in 1001, an image selection notification is received from the receiving terminal, and in 1002, the selected image is transmitted in accordance with the instruction. The receiving terminal checks the received image, decides whether or not to determine the selection, and sends the decision notification. In 1003, an appropriate branch is chosen in accordance with the decision notification sent from the receiving terminal. When the selection is determined, the transmit thread is created, as in the case of FIG. 2. Thereafter, the input thread reads the next frame data each time a frame data request notification is received in 1004. Otherwise, the process is the same in operation as that shown in FIG. 2. The transmit thread is the same in operation as that shown in FIG. 2.

Figure 11:
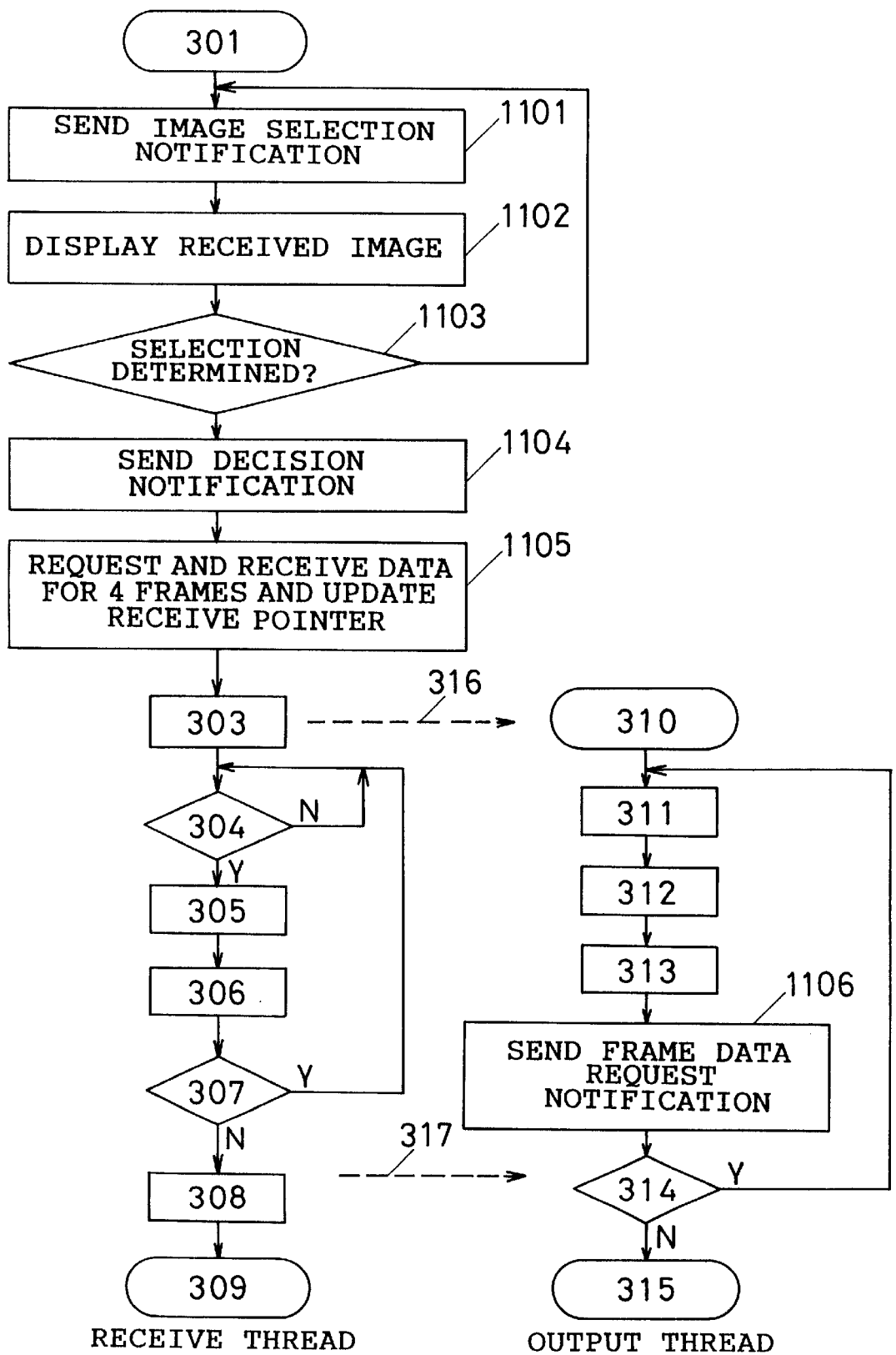
FIG. 11 is a flow chart illustrating a control program in a receiving terminal 103 according to the third embodiment of the invention.

FIG. 11 is a flow chart illustrating the control program of the receiving terminal 103. The same constituent elements as those in FIG. 3 are designated by the same reference numerals. The flow of this embodiment differs from that of FIG. 3 in that an image for transmission is selected before transmission because data at the transmitting terminal is recorded on a randomly accessible medium, and in that each time a frame data request is received, synchronization is established with the receiving terminal 103 by sending data, since the medium can be read faster than the real time.

First, in 1101, the receiving terminal 103 sends an image selection notification, and in 1102, the image transmitted in accordance with the instruction is displayed. The receiving terminal 103 checks the received image and decides whether or not to determine the selection in 1103, and if the selection is determined, sends the decision notification in 1104. When the selection is determined, then in 1105 a moving image data request notification is sent to the transmitting terminal 102 and moving image data for a prescribed number of frames are received, and the output thread is created, as in the case of FIG. 3. Thereafter, the receive thread performs the same operation as that in FIG. 3. In the output thread, on the other hand, each time image data is output to the external monitor, a request notification for the next moving image data to receive is sent to the transmitting terminal in 1106. Otherwise, the process is the same in operation as that shown in FIG. 3.

According to the above embodiment, moving image data is recorded on a randomly accessible disk medium capable of being read faster than the real time of the recorded DVC data, so that a moving image recorded at any location on the disk medium can be retrieved quickly, and after the selection is determined, the real time signal can be transmitted without interruption while maintaining synchronization with the transmitting terminal via the network.

(Embodiment 4)

Figure 12:
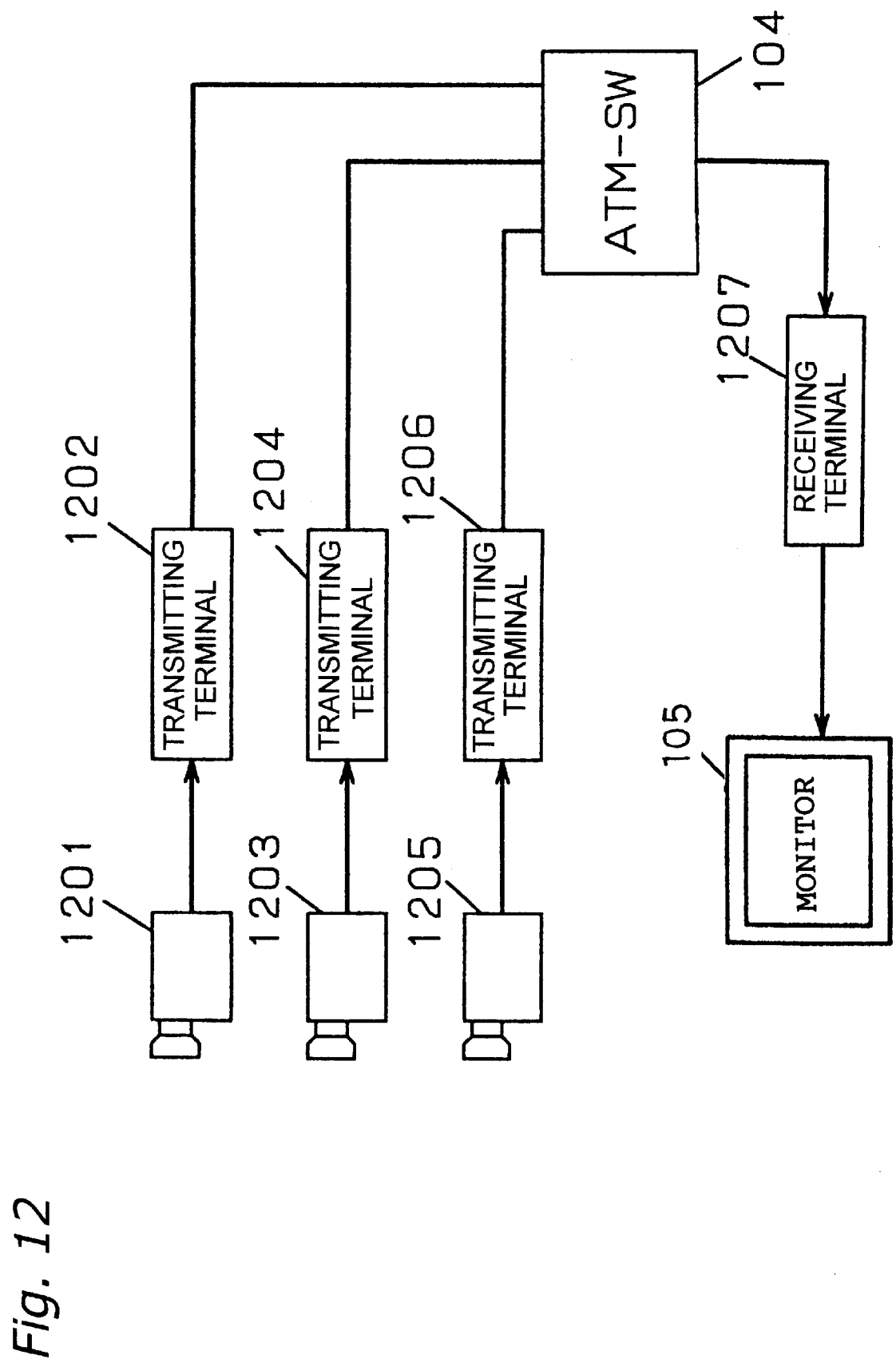
FIG. 12 is a diagram showing the configuration of a communications system according to a fourth embodiment of the present invention.

FIG. 12 is a block diagram showing a fourth embodiment of the present invention. In the figure, reference numerals 1201, 1203, and 1205 are cameras corresponding to 101 in FIG. 1, 1202, 1204, and 1206 are transmitting terminals which are identical in configuration to 102 shown in FIG. 1, and 1207 is a receiving terminal which is identical in configuration to 103 shown in FIG. 1.

According to this embodiment, when selecting a transmitting terminal, received data is immediately displayed on the monitor, and after determining the transmitting terminal selection, frame data for a prescribed number of frames are accumulated and then the image is displayed on the monitor; in this way, the desired transmitting terminal can be selected quickly, and once the selection is determined, the received image can be displayed without interruption.

The embodiments of the present invention have been described as using the TCP/IP transmission protocols for example, but since the essential characteristic of the present invention is that data is output without interruption even when the transmission capacity is temporarily restricted due to retransmissions or when transmitting means has a congestion control mechanism, the invention is not limited to using TCP/IP and configurations using other protocols having similar functions should not be excluded from the scope of the present invention.

Further, the embodiments of the present invention have been described as handling only moving images for example, but it will be appreciated that the invention can also be applied to configurations where both moving image and voice signals are transmitted simultaneously, by using, for example, time division multiplexing techniques.

As described above, according to the communications system of the present invention, at the transmitting terminal, processing for reading a real time signal and processing for sending it out on the network are performed by using multithreading techniques, and at the receiving terminal, real time signal data for a prescribed number of frames are accumulated first, and then processing for receiving real time signal data from the network and processing for outputting the accumulated data to the external monitor are performed by using multithreading techniques; this enables the real time signal to be output to the external monitor without interruption, even when the transmission capacity is temporarily restricted due to congestion, etc. on the network and transmission of the real time signal within the real time is rendered impossible.

In one preferred embodiment of the present invention, the real time signal transmitted from the transmitting terminal is a signal reproduced from a master tape on which the real time signal is prerecorded, and the real time signal is then recorded on a subtape at the receiving terminal; in this way, between apparatuses connected via a network it becomes possible to duplicate the tape with the real time signal recorded thereon without causing interruptions in the recorded signal.

In another preferred embodiment of the present invention, the real time signal to be transmitted from the transmitting terminal is prerecorded on a medium that is capable of being read faster than the real time of the recorded data and that permits random access to the recorded data; when searching for the location of desired data for transmission, the received data is immediately displayed on the monitor, and after the location is determined, frame data for a prescribed number of frames are accumulated first and then output for display on the monitor, each time followed by transmission of a data request notification to the transmitting terminal. In this way, a moving image recorded at any location on the medium can be retrieved quickly, and once the location is determined, the real time signal can be transmitted without interruption while maintaining synchronization with the transmitting terminal.

In a further preferred embodiment of the present invention, a plurality of transmitting terminals are provided, and one of the transmitting terminals is selected to transmit data to the receiving terminal; when selecting a transmitting terminal, received data is immediately displayed on the monitor, and after determining the transmitting terminal selection, frame data for a prescribed number of frames are accumulated first and then the image is displayed on the monitor. In this way, the desired transmitting terminal can be selected quickly, and once the selection is determined, the received image can be displayed without interruption.

Thus, in a network having a transmission capacity greater than the transmission rate of a real time signal, the present invention offers an enormous advantage in that the real time signal received from the transmitting end can be output at the receiving end without interruption even when the transmission capacity is temporarily restricted due to congestion, etc.

What is claimed is:

1. A communications system for communication of a real time signal having a real time requirement, comprising:

real time signal generating means for generating said real time signal of data rate R with one frame as one unit;

real time signal transmit buffer means for temporarily storing said real time signal;

real time signal transmitting means for transmitting said real time signal;

transmission means, having a transmission rate C (C>R), over which said real time signal is transmitted;

real time signal receiving means for receiving said real time signal transmitted from said real time signal transmitting means over said transmission means;

real time signal receive buffer means for temporarily storing said real time signal received by said real time signal receiving means; and real time signal outputting means for outputting said real time signal stored in said real time signal receive buffer means, wherein after sorting said real time signal for a prescribed number, N, of frames in said real time signal receive buffer means, said real time signal outputting means is activated, thereby performing control so that all generated portions of said real time signal can be output at the receiving without interruption, and said real time signal has both image and voice signals which are transmitted simultaneously.

2. A communications system according to claim 1, further comprising real time signal recording means for recording said real time on a recording medium, wherein said real time signal stored in said receive buffer means is recorded on said recording medium as said real time signal is output by said real time signal outputting means.

3. A communications system for communication of a real time signal having a real time requirement, comprising:

real time signal reproducing means for reproducing a real time signal of data rate R in real time with one frame as one unit by playing back a first information recording medium on which said real time signal is prerecorded;

real time signal transmit buffer means for temporarily storing said real time signal;

real time signal transmitting means for transmitting said real time signal;

transmission means, having a transmission rate C (C>R), over which said real time signal is transmitted;

real time signal receiving means for receiving said real time signal transmitted from said real time signal transmitting means over said transmission means;

real time signal receive buffer means for temporarily storing said real time signal received by said real time signal receiving means; and real time signal recording means for recording in real time said real time signal stored in said real time signal receive buffer means onto a second information recording medium, wherein after storing said real time signal for a prescribed number, N, of frames in said real time signal receive buffer means, said real time signal recording means is activated, thereby performing control so that all reproduced portions of said real time signal can be recorded on said second information recording medium without interruption, and said real time signal has both image and voice signals which are transmitted simultaneously.

4. A communications system according to claim 3, further comprising: real time signal reproduction control means for externally controlling reproduction start timing of said real time signal reproducing means; and real time signal recording control means for controlling recording start timing of said real time signal recording means, wherein control is performed so that all or part of said real time signal prerecorded on said first information recording medium can be recorded on said second information recording means.

5. A communications system comprising:

a real time signal recording medium on which real time signal data having a real time requirement is prerecorded on a frame by frame basis;

real time signal reproducing means capable of reading said real time signal prerecorded on said real time signal recording medium faster than real time, and capable of randomly accessing said real time signal;

real time signal transmit buffer means for temporarily storing said real time signal;

real time signal transmitting means for transmitting said real time signal;

transmission means over which said real time signal is transmitted;

real time signal receiving means for receiving said real time signal transmitted from said real time signal transmitting means over said transmission means;

real time signal receive buffer means for temporarily storing said real time signal received by said real time signal receiving means; and real time signal outputting means for outputting said real time signal stored in said real time signal receive buffer means, wherein after storing said real time signal for a prescribed number, N, of frames in said real time signal receive buffer means, said real time signal outputting means is activated, and each time said real time signal outputting means outputs said real time signal of a prescribed unit, a receive notification is sent to said real time signal transmitting means, and if said receive notification does not reach said real time signal transmitting means within a predetermined time, said real time signal read by said real time signal reproducing means is added to said real time signal transmit buffer means, thereby performing control so that all portions of said real time signal generated from said real time signal transmitting means can be output at the receiving side without interruption, and said real time signal has both image and voice signals which are transmitted simultaneously.

6. A communications system for communication of a real time signal having a real time requirement, comprising:

a plurality of real time signal generating means, each for generating said real time signal of data rate R with one frame as one unit;

a plurality of real time signal transmitting means respectively connected to said plurality of real time signal generating means;

a plurality of real time signal transmit buffer means for temporarily storing said real time signals respectively generated by said plurality of real time signal generating means;

a plurality of real time signal transmitting means respectively connected to said plurality of real time signal transmit buffer means, for transmitting said real time signals;

transmission means, having a transmission rate C (C>R), over which said real time signals are transmitted;

selecting means for selecting one of said plurality of real time signal transmitting means;

real time signal receiving means for receiving said real time signal transmitted from said real time signal transmitting means selected by said selecting means;

real time signal receive buffer means for temporarily storing said real time signal received by said real time signal receiving means; and real time signal outputting means for outputting said real time signal stored in said real time signal receive buffer means, wherein when selecting said real time signal to be received by said real time signal receiving means, the real time signal to be received is output sequentially from said real time signal transmitting means, and once the selection is determined, after storing said real time signal for a prescribed number, N, of frames in said real time signal receive buffer means said real time signal outputting means is activated, thereby performing control so that, after the selection is determined, all generated portions of said real time signal can be output at the receiving end without interruption, and said real time signal has both image and voice signals which are transmitted simultaneously.

* * * * *